(12) United States Patent
Yuan et al.

(10) Patent No.: US 11,573,451 B2
(45) Date of Patent: Feb. 7, 2023

(54) DISPLAY PANEL, FABRICATION METHOD THEREOF, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Shuai Yuan, Beijing (CN); Xiaona Liu, Beijing (CN); Yuqiong Chen, Beijing (CN); Mengjie Wang, Beijing (CN); Chenchen Wu, Beijing (CN); Ziyi Zheng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1071 days.

(21) Appl. No.: 16/315,335

(22) PCT Filed: May 17, 2018

(86) PCT No.: PCT/CN2018/087300
§ 371 (c)(1),
(2) Date: Jan. 4, 2019

(87) PCT Pub. No.: WO2019/114193
PCT Pub. Date: Jun. 20, 2019

(65) Prior Publication Data
US 2021/0356813 A1    Nov. 18, 2021

(30) Foreign Application Priority Data
Dec. 13, 2017  (CN) .......................... 201711332633.2

(51) Int. Cl.
G02F 1/1335   (2006.01)
G02F 1/1362   (2006.01)
(Continued)

(52) U.S. Cl.
CPC ...... *G02F 1/133553* (2013.01); *G02F 1/1339* (2013.01); *G02F 1/133357* (2021.01);
(Continued)

(58) Field of Classification Search
CPC ......... G02F 1/133553; G02F 1/136222; G02F 1/133357; G02F 1/133512; G02F 1/1339; G02F 2202/36
(Continued)

(56) References Cited

U.S. PATENT DOCUMENTS 6,122,027 A  *  9/2000  Ogawa ............. G02F 1/133345
                                                349/113
6,879,359 B1 *  4/2005  Kikkawa ........... G02F 1/133553
                                                349/113
(Continued)

FOREIGN PATENT DOCUMENTS

CN    101460886 A    6/2009
CN    102466833 A    5/2012
(Continued)

OTHER PUBLICATIONS

Office Action dated Mar. 5, 2019, issued in counterpart to CN Application No. 201711332633.2, with English translation (15 pages).
International Search Report dated Sep. 5, 2018, issued in counterpart Application No. PCT/CN2018/087300. (12 pages).
Extended (Supplementary)European Search Report dated Aug. 3, 2021, issued in counterpart EP Application No. 18836594.4. (7 pages).
(Continued)

*Primary Examiner* — Edward J Glick
*Assistant Examiner* — David Y Chung
(74) *Attorney, Agent, or Firm* — WHDA, LLP

(57) ABSTRACT

The present disclosure relates to display panels. The display panels may include an array substrate. The array substrate
(Continued)

may include a base substrate, a reflective layer on a surface of the base substrate, and a plurality of reflective color films distributed at intervals in an array mode on a surface of the reflective layer opposite from the base substrate. The plurality of reflective color films may be configured to enable a light being reflected by the reflective layer and then passing through one of the plurality of the reflective color films to have a color.

17 Claims, 14 Drawing Sheets

(51) Int. Cl.
*G02F 1/1333* (2006.01)
*G02F 1/1339* (2006.01)

(52) U.S. Cl.
CPC .............. *G02F 1/133512* (2013.01); *G02F 1/136222* (2021.01); *G02F 2202/36* (2013.01)

(58) Field of Classification Search
USPC ................................. 349/106, 110, 113, 114
See application file for complete search history.

(56) References Cited

U.S. PATENT DOCUMENTS

| | | | |
|---|---|---|---|
| 2009/0079908 A1 | 3/2009 | Miyazaki et al. | |
| 2012/0113360 A1* | 5/2012 | Lee | G02F 1/133512 349/86 |
| 2015/0192828 A1* | 7/2015 | Zhong | G02F 1/1368 349/46 |
| 2018/0173047 A1* | 6/2018 | Kashima | G02F 1/133516 |

FOREIGN PATENT DOCUMENTS

| | | | | |
|---|---|---|---|---|
| CN | 105759494 A | * | 7/2016 | ....... G02F 1/133345 |
| CN | 105759494 A | | 7/2016 | |
| CN | 106773266 A | | 5/2017 | |
| CN | 107861287 A | | 3/2018 | |
| JP | 2006154494 A | | 6/2006 | |
| TW | 484025 B | | 4/2002 | |

OTHER PUBLICATIONS

Office Action dated Nov. 18, 2019, issued in counterpart to CN Application No. 201711332633.2, with English translation (15 pages).

* cited by examiner

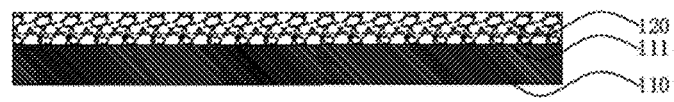
Fig. 6A
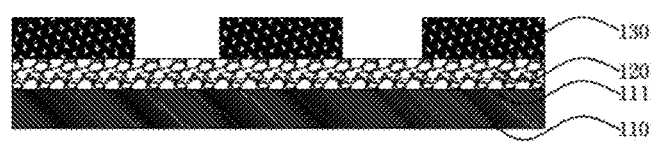
Fig. 6B
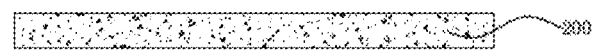
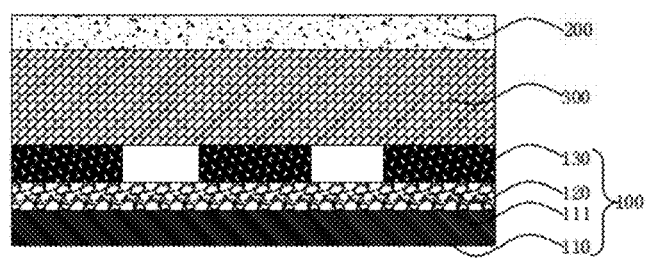
Fig. 6C
Fig. 6D

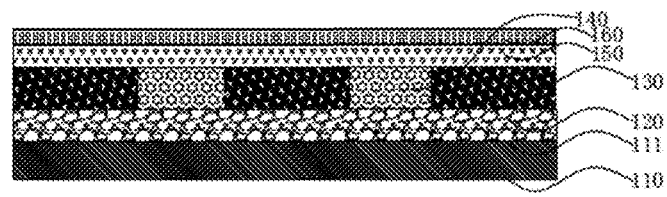
Fig. 8E
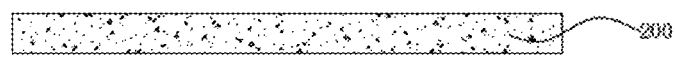
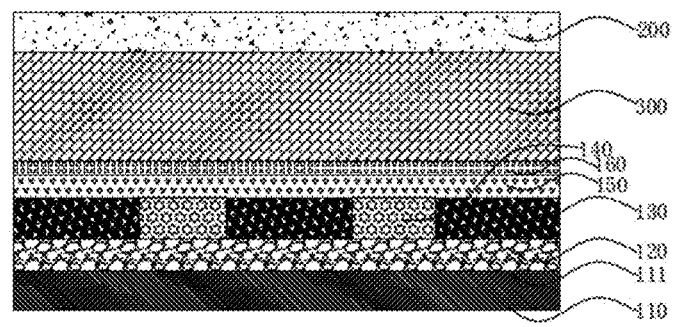
Fig. 8F
Fig. 8G

DISPLAY PANEL, FABRICATION METHOD THEREOF, AND DISPLAY APPARATUS

CROSS-REFERENCE TO RELATED APPLICATIONS

This application claims benefit of the filing date of Chinese Patent Application No. 201711332633.2 filed on Dec. 13, 2017, the disclosure of which is hereby incorporated in its entirety by reference.

TECHNICAL FIELD

This disclosure relates to a display technology, in particular, to a display panel, a fabrication method thereof, and a display apparatus.

BACKGROUND

With existing reflection display technology, pixel structures which reflect light of colors R(red), G(green) and B(blue) are fabricated on a polyethylene terephthalate or glass substrate to achieve color display. However, the types of colors of the light are greatly limited.

BRIEF SUMMARY

Accordingly, one example of the present disclosure is a display panel. The display panel may include an array substrate. The array substrate may include a base substrate, a reflective layer on a surface of the base substrate, and a plurality of reflective color films distributed at intervals in an array mode on a surface of the reflective layer opposite from the base substrate. The plurality of reflective color films are configured to enable a light being reflected by the reflective layer and then passing through one of the plurality of the reflective color films to have a color. Each of the plurality of reflective color films may include an aluminum oxide layer on the surface of the reflective layer opposite from the base substrate and a metal plasma nanostructure on a surface of the aluminum oxide layer opposite from the base substrate. The metal plasma nanostructure may be a gold plasma nanostructure. The display panel may be configured to enable the light being reflected by the reflective layer and then passing through the reflective color films to have a different color by changing a thickness of the aluminum oxide layer.

The color may include a red color, a green color, or a blue color. A thickness of each of the aluminum oxide layers in the reflective color films for the light of red color may range from approximately 43 nm to approximately 53 nm, a thickness of each of the aluminum oxide layers in the reflective color films for the light of green color may range from approximately 90 nm to approximately 96 nm, and a thickness of each of the aluminum oxide layers in the reflective color films for the light of blue color may range from approximately 80 nm to approximately 86 nm.

In one embodiment, the thickness of each of the aluminum oxide layers in the reflective color films for the light of red color may be approximately 48 nm, the thickness of each of the aluminum oxide layers in the reflective color films for the light of green color may be approximately 93 nm, and the thickness of each of the aluminum oxide layers in the reflective color films for the light of blue color may be approximately 83 nm.

The reflective layer may include at least a material selected from the group consisting of silver, aluminum, aluminum-neodymium alloy, and mixtures thereof. The metal plasma nanostructure may be a metal plasma film having a plurality of nanoscale holes. The nanoscale holes may be staggered in regular triangles in the metal plasma nanostructure. A shape of each of the plurality of nanoscale holes may be a circle, a triangle, a quadrilateral, or a polygon. In one embodiment, the shape of each of the plurality of nanoscale holes is a circle with a diameter in a range of approximately 100 to 300 nm. A distance between two adjacent nanoscale holes may be greater than 100 nm.

The array substrate may further include a plurality of circuit structures, a first planarization layer, and a first electrode on a surface of the first planarization layer opposite from the base substrate. The plurality of the circuit structures may be arranged in a same layer as the plurality of the reflective color films and located between adjacent reflective color films. The first planarization layer may be on a surface of the plurality of reflective color films and the circuit structures opposite from the surface of the substrate.

The cover plate may include a transparent substrate, a black matrix on a surface of the transparent substrate facing the array substrate, a second planarization layer, wherein the second planarization layer and the black matrix are arranged in a same layer, and a second electrode on a surface of the black matrix and the second planarization layer facing the array substrate. The cover plate may further include spacers on a surface of the second electrode facing the liquid crystal layer.

Another example of the present disclosure is a display apparatus. The display apparatus may include the display panel according to one embodiment of the present disclosure.

Another example of the present disclosure is a method of fabricating a display panel. The method may include forming an array substrate and a cover plate opposite the array substrate, cell-assembling the array substrate and the cover plate, and forming a polarizer on a surface of the cover plate opposite from the array substrate. Forming the array substrate may include forming a reflective layer on a surface of a base substrate facing the cover plate and forming a layer of a plurality of reflective color films on a surface of the reflective layer opposite from the base substrate. The reflective color films may be distributed at intervals in an array mode on a surface of the reflective layer opposite from the substrate. The plurality of reflective color films may be configured to enable a light reflected by the reflective layer and passing through the reflective color films to have one of preset colors.

Forming the cover plate may include forming a black matrix and a second planarization layer, which are arranged in a same layer, on a transparent substrate and forming a second electrode on a surface of the black matrix and the second planarization layer facing the array substrate. Forming the cover plate may further include forming spacers on a surface of the second electrode facing the liquid crystal layer.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the are apparent from the following detailed description taken in conjunction with the accompanying drawings in which:

FIGS. 6A-6E show a schematic flow diagram of a method of fabricating a display panel according to some embodiments of the present disclosure;

FIGS. 8A-8H show a schematic flow diagram of a method of fabricating a display panel according to some embodiments of the present disclosure;

DETAILED DESCRIPTION

The present disclosure will be described in further detail with reference to the accompanying drawings and embodiments in order to provide a better understanding by those skilled in the art of the technical solutions of the present disclosure. Throughout the description of the present disclosure, reference is made to FIGS. 1-14. Specific technologies or conditions which are not noted in the embodiments are according to the technical or conditions described in references in the field, or product specifications. The reagents or instruments used which are not noted with produce manufacturers, are conventional products which can be obtained through commercially market.

A numerical range modified by "approximately" herein means that the upper and lower limits of the numerical range can vary by 10% thereof. A number modified by "approximately" herein means that the number can vary by 10% thereof.

Figure 1:
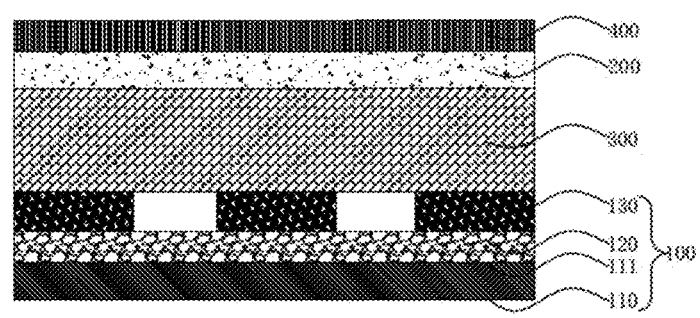
FIG. 1 is a schematic diagram of a display panel according to some embodiments of the present disclosure.

A display panel is provided according to some embodiments of the present disclosure. As shown in FIG. 1, the display panel includes an array substrate 100 and a cover plate 200 opposite the army substrate 100, a liquid crystal layer 300 arranged between the array substrate 100 and the cover plate 200, and a polarizer 400 arranged on a surface of the cover plate 200 opposite from the array substrate 100. The array substrate 100 includes a base substrate 110, a reflective layer 120, and a layer of a plurality of reflective color films 130. The reflective layer 120 is arranged on a first surface 111 of the base substrate 110 facing the cover plate 200. The reflective color films 130 are spaced from one another and are distributed in an array on a surface of the reflective layer 120 opposite from the base substrate 110. As such, an exiting light reflected by the reflective layer 120 and then passing through the reflective color films 130 has a preset color. In fact, the reflective color films 130 of the display panel in combination with the reflective layer 120 can reflect out light of colors R, G and B. In addition, in combination with the liquid crystal layer 300 and the polarizer 400, full-color display with bright and vivid display color and excellent display effect can be achieved.

The type of the base substrate 110 is not particularly limited according to the embodiments of the present disclosure. The suitable base substrate 110 includes, but is not limited to, a polyethylene terephthalate (PET) substrate, a polybutylene terephthalate (PBT) substrate, a glass substrate or the like. In some embodiments, the base substrate 110 is a glass substrate. As such, the material has wide sources and it is easy to obtain the material. Furthermore, the cost of the base substrate is low.

The thickness of the base substrate 110 is not particularly limited according to the embodiments of the present disclosure. In some embodiments, the thickness of the base substrate 110 ranges from approximately 0.3 to approximately 0.7 mm. In some embodiments, the thickness of the base substrate 110 is approximately 0.3 mm. As such, the display panel is thin, thereby satisfying market trends of being light and thin. Furthermore, the cost of raw material thereof is low.

The type of the material of the reflective layer 120 is not particularly limited according to the embodiments of the present disclosure. In some embodiments, the reflective layer 120 is made of a metal material such as silver, aluminum, aluminum-neodymium alloy, and the like. In some embodiments, the reflective layer 120 is made of silver. As such, the reflectivity of the reflective layer 120 is high, thereby improving light utilization rate. Accordingly, the display panel has good display effect.

Figure 2A:
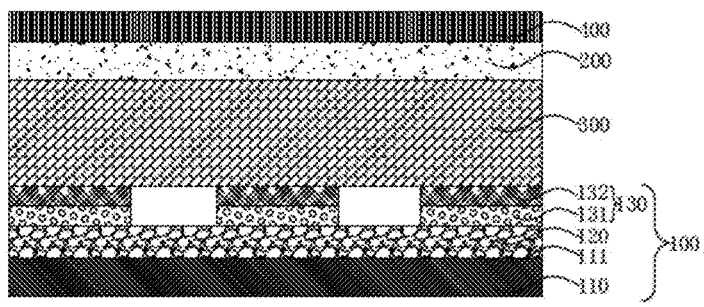
FIG. 2A shows a schematic diagram of a display panel according to some embodiments of the present disclosure.
Figure 2B:
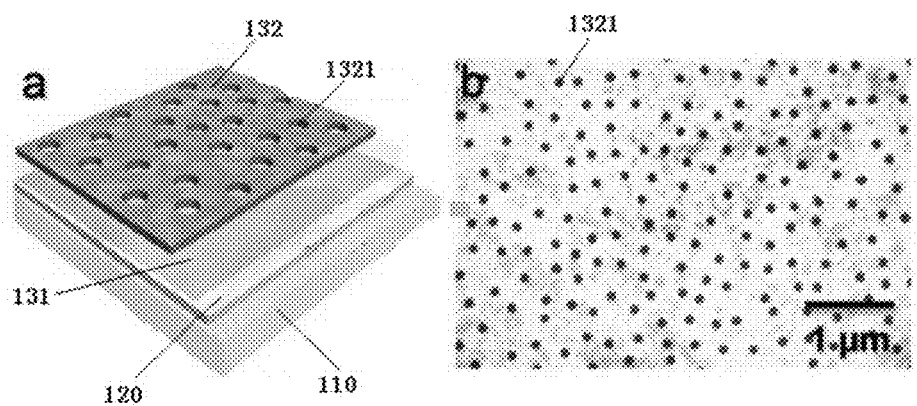
FIG. 2B shows a partial structure diagram of a display panel according to some embodiments of the present disclosure.

The thickness of the reflective layer 120 is not particularly limited according to the embodiments of the present disclosure. In some embodiments, the thickness of the reflective layer 120 ranges from approximately 130 nm to approximately 170 nm. In some embodiments, the thickness of the reflective layer is approximately 150 nm. As such, the thickness of the reflective layer 120 is moderate. That is, the reflective layer 120 is not so thin as to cause relatively low reflectivity, relatively low light utilization rate, or poor display effect of the display panel. Meanwhile, the reflective layer 120 is not so thick as to cause relatively high cost and difficulty in large-scale production. According to some embodiments, as shown in FIGS. 2A and 2B, the reflective color film 130 includes an aluminum oxide layer 131 and a metal plasma nanostructure 132. The aluminum oxide layer 131 is arranged on a surface of the reflective layer 120 opposite from the substrate 110. The metal plasma nanostructure 132 is arranged on a surface of the aluminum oxide layer 131 opposite from the base substrate 110. As such, the light being reflected by the reflective layer 120 and then passing through the reflective color film 130 has a preset color.

The preset color mentioned above is not particularly limited according to the embodiments of the present disclosure. Persons of ordinary skill in the art can flexibly select the preset color according to the needs of display effect. In some embodiments, the preset color includes a variety of different colors. The thickness of the aluminum oxide layer 131 in the reflective color film 130 is different for different colors of exiting lights. Therefore, the type of the preset color can be adjusted by adjusting the thicknesses of the aluminum oxide layer 131, thereby effectively realizing color display. According to some embodiments, the thickness of the aluminum oxide layer 131 can be adjusted to display three primary colors, which are red, green and blue. The arrangement mode of the reflective color films for exiting light of colors red, green and blue respectively can be consistent with that of sub-pixels of colors R, G, B in a conventional three-primary-color display apparatus. In some embodiments, the thickness of the aluminum oxide layer 131 of the reflective color film 130 ranges from approximately 43 nm to approximately 53 nm for exiting light of color red. The thickness of the aluminum oxide layer 131 of the reflective color film 130 ranges from approximately 90 nm to approximately 96 nm for exiting light of the color green. The thickness of the aluminum oxide layer 131 of the reflective color film 130 ranges from approximately 80 nm to approximately 86 nm for exiting light of color blue. Therefore, three-primary-color display can be realized with excellent display color and display effect. In one embodiment, the thickness of the aluminum oxide layer 131 of the reflective color film 130 for exiting light of the color red is approximately 48 nm. The thickness of the aluminum oxide layer 131 of the reflective color film 130 for exiting light of the color green is approximately 93 nm. The thickness of the aluminum oxide layer 131 of the reflective color film 130 for exiting light of the color blue is approximately 83 nm. As such, with the thicknesses thereof as mentioned above, the display color is pure, uniform, bright, and vivid, and the display effect is excellent.

According to some embodiments of the present disclosure, the specific material of the metal plasma nanostructures 132 is not particularly limited. In some embodiments, the metal material of the metal plasma nanostructures 132 can include, but is not limited to, a gold plasma nanostructure, a silver plasma nanostructure, and the like. In some embodiments, the metal plasma nanostructures 132 are gold plasma nanostructures, thereby obtaining better colorful effect of reflected light.

According to some embodiments of the present disclosure, the thickness of the metal plasma nanostructures 132 is not particularly limited. In some embodiments, the thickness of the metal plasma nanostructures 132 ranges from approximately 20 nm to 50 nm. In one embodiment, the thickness of the metal plasma nanostructures 132 is 20 nm. As such, besides that the light being reflected by the reflective layer 120 and then passing through the reflective color film 130 has a predetermined color, the thickness of the metal plasma nanostructures 132 can also be reduced to a maximum extent, thereby reducing the cost and facilitating industrial production.

According to some embodiments of the present disclosure, the specific structure of the metal plasma nanostructures 132 is not particularly limited. In some embodiments, as shown in FIG. 2B, the metal plasma nanostructure 132 is a metal plasma film with a plurality of nanoscale holes 1321. As such, the colorful effect of the reflected light can be further improved.

According to some embodiments of the present disclosure, the shape of the nanoscale holes 1321 is not particularly limited. In some embodiments, the shape of the holes 1321 can be a circle (FIG. 2B), a triangle, a quadrilateral, a polygon, or the like. In one embodiment, the shape of the holes 1321 is a circle. As such, the colorful effect of the reflected light can be further improved. Furthermore, the fabrication process is simple, convenient, easy to be implemented, and easy for an industrial production.

According to some embodiments of the present disclosure, the diameter of the holes 1321 is not particularly limited. In some embodiments, the diameter of the holes 1321 ranges from approximately 100 nm to approximately 300 nm. In one embodiment, the diameter of the holes 1321 is approximately 150 nm. As such, the colorful effect of the reflected light can be further improved.

According to some embodiments of the present disclosure, the arrangement mode of the holes 1321 on the metal plasma nanostructure 132 is not particularly limited. The arrangement mode includes, but is not limited to, random distribution, staggered distribution of regular triangles, or the like. In one embodiment, the holes 1321 are staggered in regular triangles in the metal plasma nanostructure 132. As such, the colorful effect of the reflected light can be further improved.

According to some embodiments of the present disclosure, the distance between two adjacent holes 1321 is not particularly limited. In some embodiments, the distance between two adjacent holes 1321 is greater than 100 nm. In one embodiment, the distance between two adjacent holes 1321 is approximately 273 nm. As such, the colorful effect of the reflected light can be further improved.

Figure 3:
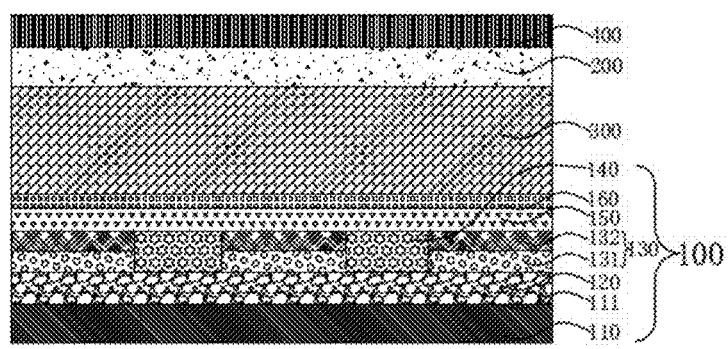
FIG. 3 shows a schematic diagram of a display panel according to some embodiments of the present disclosure.

According to some embodiments of the present disclosure, as shown in FIG. 3, the array substrate 100 further includes circuit structures 140, a first planarization layer 150, and a first electrode 160. The circuit structures 140 and the reflective color films 130 are arranged in the same layer. Also, the circuit structures 140 are located between adjacent reflective color films 130. The first planarization layer 150 is arranged on a surface of the reflective color films 130 and the circuit structures 140 opposite from the base substrate 110. The first electrode 160 is arranged on a surface of the first planarization layer 150 opposite from the base substrate 110.

According to some embodiments of the present disclosure, structure, connection mode and the like of the circuit structures 140 are not particularly limited. The circuit structures 140 can have a structure of a conventional circuit including components such as thin film transistors, connection lines, and the like. The description thereof is not repeated herein. As such, the reflected light can be controlled to achieve full-color display.

According to some embodiments of the present disclosure, the specific types of the material of the first planarization layer 150 are not particularly limited. In some embodiments, the first planarization layer 150 can be made of a dielectric material such as, but not limited to, photoresist, silicon on glass (SOG), and the like. As such, the surface of the array substrate 100 can be completely flat.

According to some embodiments of the present disclosure, the specific types of the material of the first electrode 160 are not particularly limited. In some embodiments, the materials of the first electrode 160 include, but are not limited to, indium zinc oxide, indium tin oxide (ITO), and other transparent conductive oxide electrodes. In one embodiment, the first electrode 160 is an ITO electrode. As such, the material has wide sources and it is easy to obtain. Furthermore, the ITO electrode has high transmittance and good conductivity.

Figure 4:
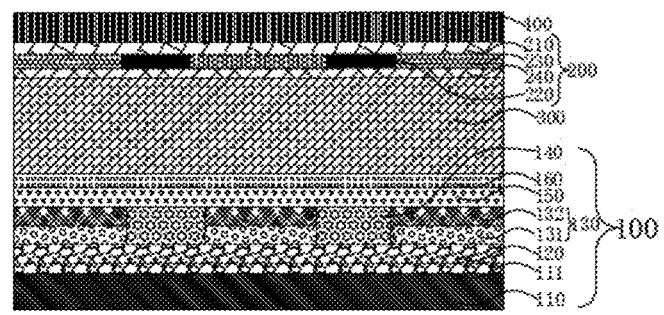
FIG. 4 shows a schematic diagram of a display panel according to some embodiments of the present disclosure.

According to some embodiments of the present disclosure, as shown in FIG. 4, the cover plate 200 includes a transparent substrate 210, a black matrix 220 and a second planarization layer 230, and a second electrode 240. The black matrix 220 is arranged on a surface of the transparent substrate 210 facing the array substrate 100. The second planarization layer 230 and the black matrix 220 are arranged on the same layer. The second electrode 240 is arranged on a surface of the black matrix 220 and the second planarization layer 230 facing the array substrate 100.

The specific type of the transparent substrate 210 is not particularly limited according to the embodiments of the present disclosure. The suitable transparent substrate 210 may include, but is not limited to, a polyethylene terephthalate (PET) substrate, a polybutylene terephthalate (PBT) substrate, a glass substrate or the like. In one embodiment, the transparent substrate 210 is a glass substrate. As such, the material has wide sources, and it is easy to obtain. Furthermore, the cost of the material is low.

The specific type of the material of the black matrix 220 is not particularly limited according to the embodiments of the present disclosure. The material of the black matrix 220 can be made of metal oxide films or high light-shielding resins such as, but not limited to, chromium oxide, tungsten oxide, and the like. As such, light leakage between pixels can be effectively prevented, and color contrast is increased.

The specific type of the material of the second planarization layer 230 is not particularly limited according to the embodiments of the present disclosure. In some embodiments, the second planarization layer 230 is made of a passivation material such as, but not limited to, optical glue, silicon on glass (SOG), and the like. As such, the phenomenon of electrostatic corrosion occurring on the peripheral circuit of the cover plate 200 can be effectively avoided, thereby improving image quality of the display panel and reducing the cost caused by a large number of defective products.

The specific type of the material of the second electrode 240 is not particularly limited according to the embodiments of the present disclosure. In some embodiments, the suitable material of the second electrode 240 can be, but is not limited to, ITO, indium zinc oxide or other transparent conductive oxide electrodes. In one embodiment, the second electrode 240 is an ITO electrode. As such, the material has wide sources, and it is easy to obtain. Furthermore, the material has low cost and good conductivity.

Figure 5:
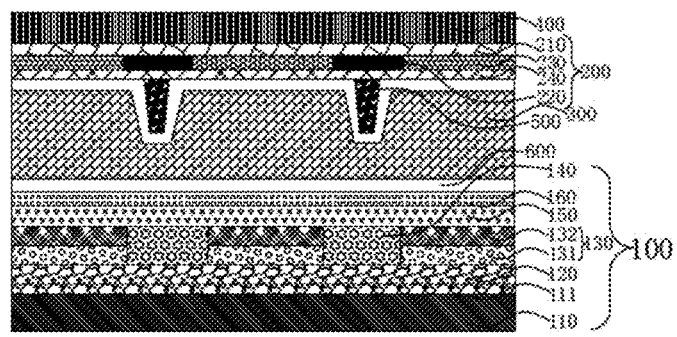
FIG. 5 shows a schematic diagram of a display panel according to some embodiments of the present disclosure.

According to some embodiments of the present disclosure, as shown in FIG. 5, a plurality of spacers 500 is further arranged on one side of the second electrode 240 facing the liquid crystal layer 300. As such, the array substrate 100 can be supported, thereby ensuring a certain thickness of the display panel.

According to some embodiments of the present disclosure, as shown in FIG. 5, alignment layers 600 are provided on two sides of the liquid crystal layer 300 closer to the array substrate 1000 and the cover plate 200 respectively. The specific type of material of the alignment layer 600 is not particularly limited. In some embodiments, the alignment layer 600 is made of polyimide (PI). As such, the liquid crystals can have a preset arrangement direction, thereby effectively realizing the display function.

According to some embodiments of the present disclosure, the specific type of material of the liquid crystal layer 300 is not particularly limited. In some embodiments, the suitable material of the liquid crystal layer 300 includes, but is not limited to, polymeric liquid crystal materials and the like. In some embodiments, the liquid crystal layer 300 is made of an ester type or biphenyl type of liquid crystal compound. As such, deflections of liquid crystal molecules in the liquid crystal layer 300 can be controlled to realize controlling of display grayscale of corresponding pixels of the reflective layer 120.

According to some embodiments of the present disclosure, the specific type of the polarizer 400 is not particularly limited. In some embodiments, the suitable polarizer 400 includes, but is not limited to, an iodine-based polarizer or a dye-based polarizer. In one embodiment, the polarizer 400 is an iodine-based polarizer. As such, optical characteristics such as high transmittance and high polarization can be obtained. In other embodiments, the polarizer 400 is a dye-based polarizer. As such, the display panel has excellent high-temperature resistance and high-humidity resistance, and the display panel is not easily damaged.

Without being held to a particular theory, the operational principle of the display panel of the present disclosure is described in detail below with reference to FIG. 5. Specifically, an ambient light passes through the polarizer 400 to form a polarized light to enter the display panel, and then the polarized light irradiates the reflective layer 120 through the reflective color films 130. After that, the polarized light is reflected by the reflective layer 120 and then passes through the reflection color films 130 again. Because of the effect of the reflection color films 130, the polarized light exiting through one of the reflection color films 130 is converted into a polarized light with a preset color. The preset color may be a red color, a green color, or a blue color. By applying different voltages to the liquid crystal layer 300 through the first electrode 160 and the second electrode 240, the polarized light with the preset color can be deflected to different degrees when passing through the liquid crystal layer. The polarized light with the preset color then passes through the polarizer 400 again and is emitted out to realize the grayscale display. Meanwhile, since the emitted polarized light has a preset color of red, green, or blue, full-color display can be achieved.

A display apparatus is provided according to some embodiments of the present disclosure. The display apparatus includes the display panel according to one embodiment of the present disclosure. The display apparatus can achieve full-color display. Furthermore, the display color is bright and vivid, and the display effect is excellent. In addition, the display apparatus has all the features and advantages of the display panel mentioned above, and the description is not repeated herein.

The specific type of the display apparatus is not limited. The display apparatus can be, but not limited to, a mobile phone, a tablet computer, a wearable apparatus, a game machine or the like. According to the embodiments of the present disclosure, shape, structure, and fabricating process of the display apparatus are not particularly limited. Furthermore, besides the display panel mentioned above, the display apparatus has other structures of a conventional display apparatus. Taking a mobile phone as an example, the display apparatus further includes a housing, a central processing unit (CPU), a camera module, a fingerprint identification module, a sound processing system, and the like. The description is not repeated herein.

A fabrication method of the display panel is provided according to some embodiments of the present disclosure. As shown in FIGS. 6A-6E and FIG. 7, the method includes the following steps:

In step S100, an array substrate 100 is formed.

According to some embodiments, as shown in FIGS. 6A and 6B, the step of forming the array substrate 100 includes the following steps:

In step S110, a reflective layer 120 is formed on the first surface 111 of the base substrate 110, as shown FIG. 6A.

The specific process of forming the reflective layer 120 on the first surface 111 of the base substrate 110 is not particularly limited according to the embodiments of the present disclosure. In some embodiments, the specific process of forming the reflective layer 120 on the first surface 111 of the substrate 110 can use chemical vapor deposition. As such, the process is simple, convenient, easy to be implemented, and easy for industrial production.

In step S120, a plurality of reflective color films 130 is formed on a surface of the reflective layer 120 opposite from the base substrate 110. As shown in FIG. 6B, the plurality of reflective color films 130 is spaced from each other and is distributed in an array. It is used for enabling the light being reflected by the reflective layer 120 and then passing through the reflective color film 130 to have a preset color.

In step S200, as shown in FIG. 6C, a cover plate 200 is formed and arranged to be opposite the array substrate 100.

In step S300, as shown in FIG. 6D, the array substrate 100 and the cover plate 200 are cell-assembled.

According to some embodiments of the present disclosure, the steps of performing cell-assembly of the array substrate 100 and the cover plate 200 are not particularly limited. In some embodiments, first, the array substrate 100 and the cover plate 200 can be cell-assembled. Then, liquid crystals are poured between the army substrate 100 and the cover plate 200 to form a liquid crystal layer 300. With this approach, the process is simple, convenient, easy to be implemented, and easy for industrial production.

Figure 6E:
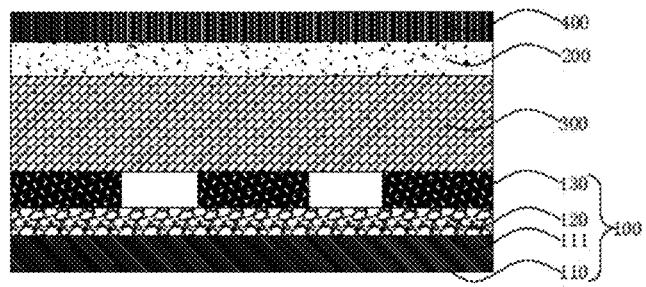
Figure 7:
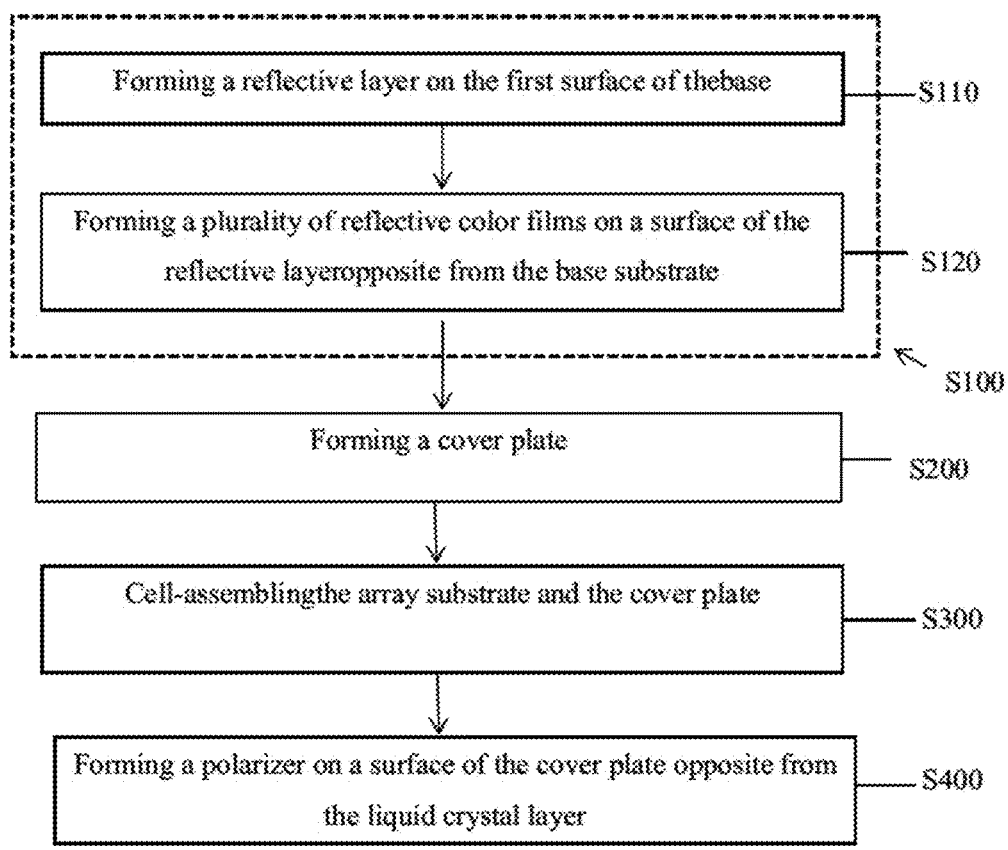
FIG. 7 shows a flow diagram of a method of fabricating a display panel according to some embodiments of the present disclosure.

In step S400, as shown in FIG. 6E, a polarizer 400 is formed on a surface of the cover plate 200 opposite from the liquid crystal layer 300.

According to some embodiments of the present disclosure, the specific process of forming the polarizer 400 on a surface of the cover plate 200 opposite from the liquid crystal layer 300 is not particularly limited. In some embodiments, a polarizer 400 is formed on a surface of the cover plate 200 opposite from the liquid crystal layer 300 by attaching. As such, the process is simple, convenient, easy to be implemented, and easy for industrial production.

It should be noted that the method can be applied to the fabrication of the display panel mentioned above. The army substrate 100, the cover plate 200, the liquid crystal layer 300, the polarizer 400 and the like are consistent with the display panel above. The description is not repeated herein.

According to some embodiments of the present disclosure, as shown in FIGS. 8A-8H and FIG. 9, in step S100, forming an array substrate 100 can further include the following steps:

In step S130, as shown in FIG. 5C, circuit structures 140 are formed between the plurality of reflective color films 130.

According to some embodiments of the present disclosure, the specific process of forming the circuit structures 140 between the plurality of reflective color films 130 is not particularly limited.

Figure 8A:
Figure 8B:
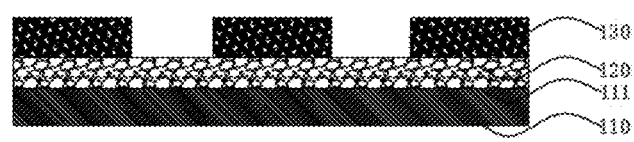
Figure 8C:
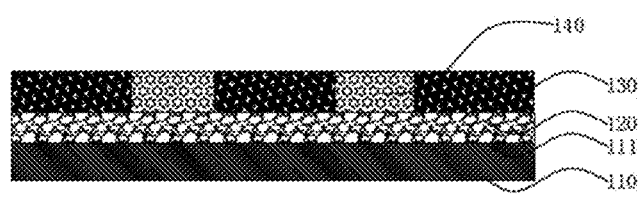
Figure 8D:
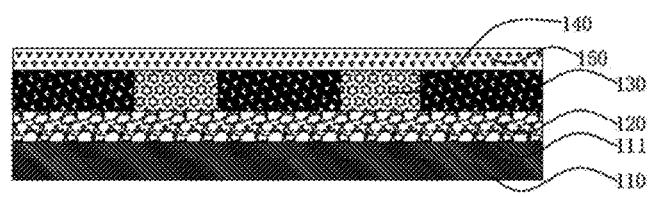
Figure 8H:
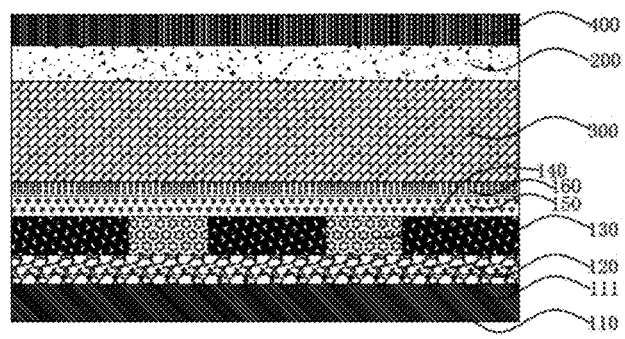
Figure 9:
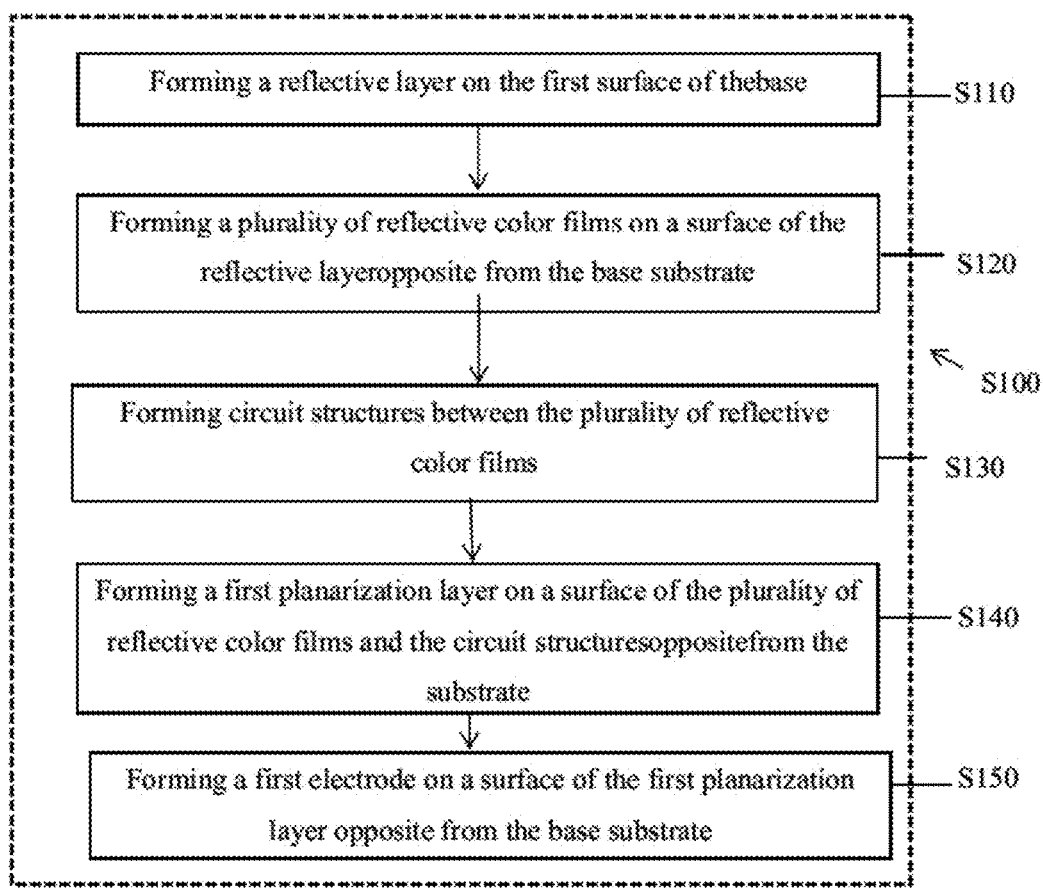
FIG. 9 shows a flow diagram of a method of fabricating a display panel according to some embodiments of the present disclosure.

In step S140, as shown in FIG. 8D, a first planarization layer 150 is formed on a surface of the plurality of reflective color films 130 and the circuit structures 140 opposite from the substrate 110.

According to the embodiments of the present disclosure, the step of forming a first planarization layer 150 on a surface of the plurality of reflective color films 130 and the circuit structures 140 opposite from the base substrate 110 is not particularly limited. In some embodiments, the step of forming the first planarization layer 150 on a surface of the plurality of reflective color films 130 and the circuit structures 140 opposite from the base substrate 110 includes chemical vapor deposition. As such, the process is simple, convenient, easy to be implemented, and easy for industrial production.

In step S150, as shown in as shown in FIG. 8E, a first electrode 160 is formed on a surface of the first planarization layer 150 opposite from the base substrate 110.

According to some embodiments of the present disclosure, the specific process of forming the first electrode 160 on a surface of the first planarization layer 150 opposite from the base substrate 110 is not particularly limited. In some embodiments, the specific process of forming the first electrode 160 on a surface of the first planarization layer 150 opposite from the base substrate 110 includes chemical vapor deposition. As such, the process is simple, convenient, easy to be implemented, and easy for industrial production.

Figure 10A:
FIGS. 10A-10F show a schematic flow diagram of a method of fabricating a display panel according to some embodiments of the present disclosure.
Figure 10B:
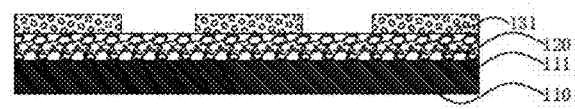

According to some embodiments of the present disclosure, as shown in FIGS. 10A-10F and FIG. 11, in step S120, forming the reflective color films 130 specifically includes the following steps:

In step S121, an aluminum oxide layer 131 is formed on a surface of the reflective layer 120 opposite from the substrate 110, as shown FIG. 10B.

According to some embodiments of the present disclosure, the specific process of forming the aluminum oxide layer 131 on a surface of the reflective layer 120 opposite from the base substrate 110 is not particularly limited. In some embodiments, the specific process of forming the aluminum oxide layer 131 on a surface of the reflective layer 120 opposite from the base substrate 110 includes chemical vapor deposition. As such, the process is simple, convenient, easy to be implemented, and easy for industrial production.

Figure 10C:
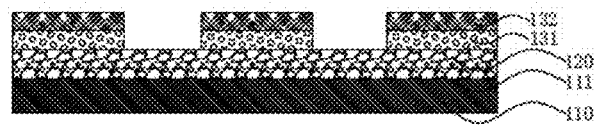
Figure 10D:
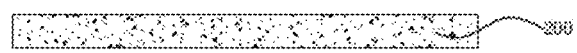
Figure 10D:
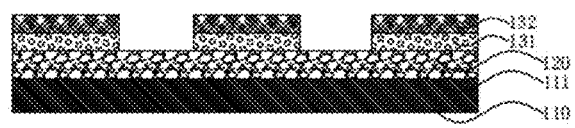
Figure 10E:
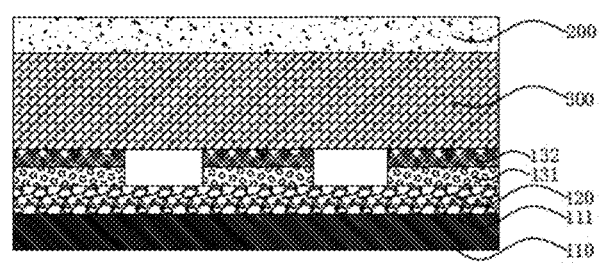
Figure 10F:
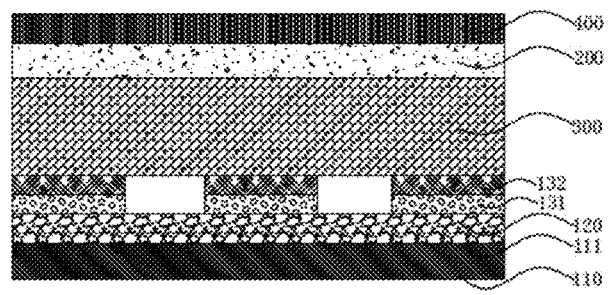
Figure 11:
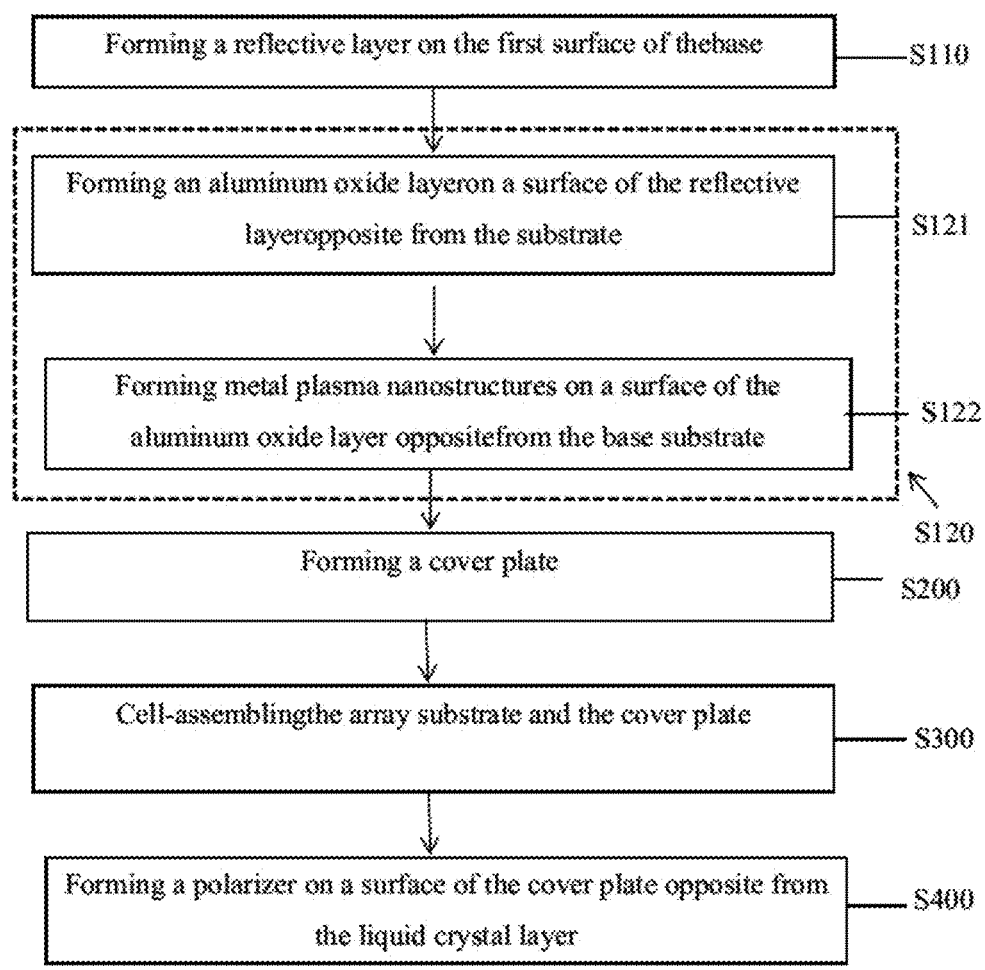
FIG. 11 shows a flow diagram of a method of fabricating a display panel according to some embodiments of the present disclosure.

In step S122, as shown in FIG. 10C, metal plasma nanostructures 132 are formed on a surface of the aluminum oxide layer 131 opposite from the base substrate 110.

According to the embodiments of the present disclosure, the specific process of forming the metal plasma nanostructures 132 on a surface of the aluminum oxide layer 131 opposite from the base substrate 110 is not particularly limited. In some embodiments, the specific process of forming the metal plasma nanostructures 132 on a surface of the aluminum oxide layer 131 opposite from the base substrate 110 includes chemical vapor deposition. As such, the process is simple, convenient, easy to be implemented, and easy for industrial production.

Figure 12A:
FIGS. 12A-12F show a schematic flow diagram of a method of fabricating a display panel according to some embodiments of the present disclosure.
Figure 12B:
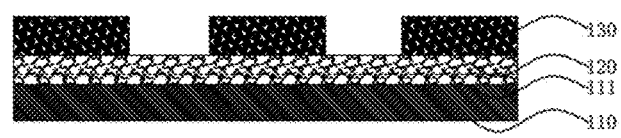
Figure 12C:

According to some embodiments of the present disclosure, as shown in FIGS. 12A-12F and FIG. 13, in step S200, forming the cover plate 200 can specifically include the following steps:

In step S210, as shown in FIG. 12C, a black matrix 220 and a second planarization layer 230, which are arranged in the same layer, are formed on the transparent substrate 210.

According to the embodiments of the present disclosure, the specific process of forming the black matrix 220 and the second planarization layers 230 in the same layer on the transparent substrate 210 is not particularly limited. In some embodiments, the specific process of forming the black matrix 220 and the second planarization layer 230 in the same layer on the transparent substrate 210 can use chemical vapor deposition, photoetching or other patterning processes. As such, the process is simple, convenient, easy to be implemented, and easy for industrial production.

Figure 12D:
Figure 12D:
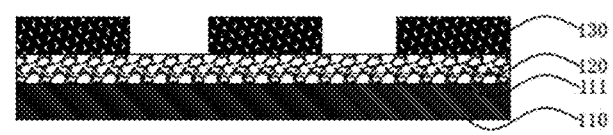
Figure 12E:
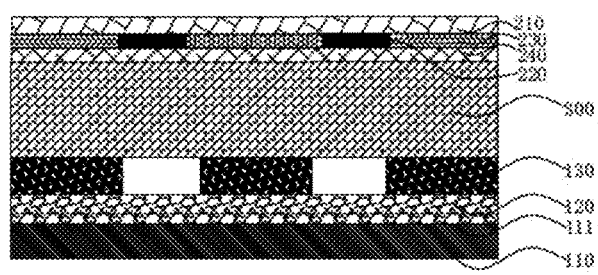
Figure 12F:
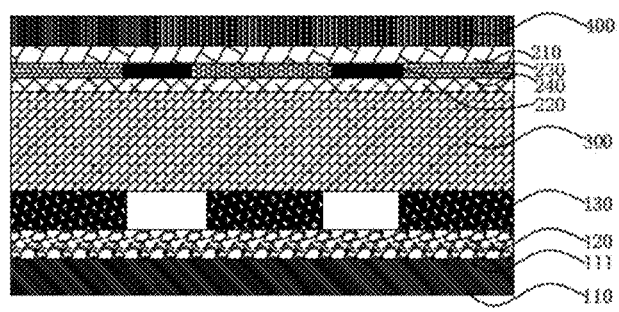
Figure 13:
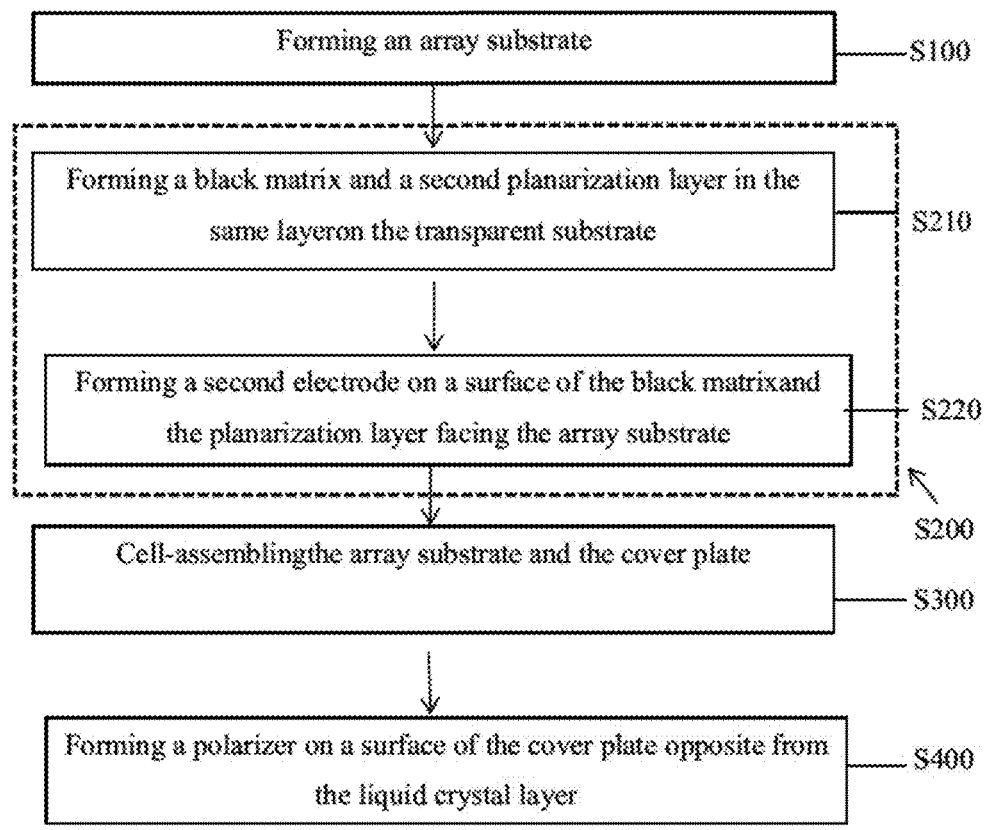
FIG. 13 shows a flow diagram of a method of fabricating a display panel according to some embodiments of the present disclosure.

In step S220, a second electrode 240 is formed on a surface of the black matrix 220 and the planarization layer 230 facing the army substrate 100, as shown in FIG. 12D.

According to the embodiments of the present disclosure, the specific process of forming a second electrode 240 on a surface of the black matrix 220 and the planarization layer 230 facing the array substrate 100 is not particularly limited. In some embodiments, the specific process of forming a second electrode 240 on a surface of the black matrix 220 and the planarization layer 230 facing the array substrate 100 includes chemical vapor deposition. As such, the process is simple, convenient, easy to be implemented, and easy for industrial production.

Figure 14:
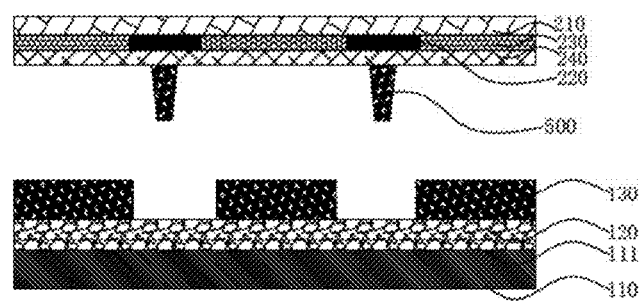
FIG. 14 shows a structural diagram of a cover plate according to some embodiments of the present disclosure.

According to some embodiments of the present disclosure, as shown in FIG. 14, after forming the second electrode 240, the step of forming the cover plate 200 can further include a step of forming spacers 500 on a side of the second electrode 240 facing the liquid crystal layer 300.

According to some embodiments of the present disclosure, the specific process of forming the spacers 500 is not particularly limited. In some embodiments, the specific process of forming the spacers 500 can use chemical vapor deposition, physical vapor deposition, photoetching or the like. As such, the process is simple, convenient, easy to be implemented, and easy for industrial production. In addition, uniformity of the spacers 500 is relatively high so that the quality of the display panel is effectively improved.

According to some embodiments of the present disclosure, after the spacers 500 are formed, the other steps of fabricating the display panel are the same as the steps S300 and S400. The description is not repeated herein. The structure of the finally formed display panel is shown in FIG. 5.

In the description of the present disclosure, the terms "center," "horizontal," "vertical," "length," "width," "thickness," "upper," "lower," "front," "back," "left," "right," "vertical," "horizontal," "top," "bottom," "inner," "outer," "a clockwise direction," "an anticlockwise direction," "an axial direction," "a radial direction," "a circumferential direction," or the like are based on the orientation or positional relationship shown in the drawings. They are used merely for convenience of description and simplifying description of the present invention, but not to indicate or imply that the indicated apparatus or element must have a specific orientation, or be constructed and operated in a specific orientation, therefore cannot be construed as a limitation of the present disclosure.

In addition, the terms "first" and "second" are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

In the disclosure, unless explicitly stated and defined otherwise, when the first feature is "above" the second feature or "below" the second feature, the two features can be in direct contact or indirect contact through an intermediate medium. Also, that the first feature is "above" the second feature can be that the first feature is above or obliquely above the second feature, or only a height of the first feature is higher than that of the second feature. That the first feature is "below" the second feature can be that the first feature is below or obliquely below the second feature, or only indicates that a height of the first feature is smaller than that of the second feature.

In the description of the specification, references made to the term "some embodiment," "some embodiments" and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples.

The principles and the embodiments of the present disclosure are set forth in the specification. The description of the embodiments of the present disclosure is only configured to help in understanding the method of the present disclosure and the core ideas thereof. Meanwhile, for a person of ordinary skill in the art, the disclosure relates to the scope of the present disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

DESCRIPTION OF SYMBOLS IN THE DRAWINGS

100: array substrate
110: base substrate
111: first surface
120: reflective layer
130: reflective color film
131: aluminum oxide layer
132: metal plasma nanostructures
140: circuit structure
150: first planarization layer
160: first electrode
200: cover plate
210: transparent substrate
220: black matrix
230: second planarization layer
240: second electrode
300: liquid crystal layer
400: polarizer
500: spacer
600: alignment layer

What is claimed is:

1. A display panel, comprising:
an array substrate;
the array substrate comprising:
  a base substrate;
  a reflective layer on a surface of the base substrate; and
  a plurality of reflective color films distributed at intervals in an array mode on a surface of the reflective layer opposite from the base substrate;
  wherein the plurality of reflective color films are configured to enable a light being reflected by the reflective layer and then passing through one of the plurality of reflective color films to have a color; and
  wherein each of the plurality of reflective color films comprises:
    an aluminum oxide layer on the surface of the reflective layer opposite from the base substrate;
    a metal plasma nanostructure on a surface of the aluminum oxide layer opposite from the base substrate; and the display panel is configured to enable the light being reflected by the reflective layer and then passing through the reflective color films to have a different color by changing a thickness of the aluminum oxide layer.

2. The display panel according to claim 1, wherein the metal plasma nanostructure is a gold plasma nanostructure.

3. The display panel according to claim 1, wherein the color comprises a red color, a green color, or a blue color, a thickness of each of the aluminum oxide layers in the reflective color films for the light of red color ranges from approximately 43 nm to approximately 53 nm, a thickness of each of the aluminum oxide layers in the reflective color films for the light of green color ranges from approximately 90 nm to approximately 96 nm, and a thickness of each of the aluminum oxide layers in the reflective color films for the light of blue color ranges from approximately 80 nm to approximately 86 nm.

4. The display panel according to claim 3, wherein the thickness of each of the aluminum oxide layers in the reflective color films for the light of red color is approximately 48 nm, the thickness of each of the aluminum oxide layers in the reflective color films for the light of green color is approximately 93 nm, the thickness of each of the aluminum oxide layers in the reflective color films for the light of blue color is approximately 83 nm.

5. The display panel according to claim 1, wherein the reflective layer comprises at least a material selected from the group consisting of silver, aluminum, aluminum-neodymium alloy, and mixtures thereof.

6. The display panel according to claim 1, wherein the metal plasma nanostructure is a metal plasma film having a plurality of nanoscale holes.

7. The display panel according to claim 6, wherein the nanoscale holes are staggered in regular triangles in the metal plasma nanostructure.

8. The display panel according to claim 6, wherein a shape of each of the plurality of nanoscale holes is a circle, a triangle, a quadrilateral, or a polygon.

9. The display panel according to claim 8, wherein the shape of each of the plurality of nanoscale holes is a circle with a diameter in a range of approximately 100 to 300 nm.

10. The display panel according to claim 9, wherein a distance between two adjacent nanoscale holes is greater than 100 nm.

11. A display panel, comprising:
an array substrate;
the array substrate comprising:
  a base substrate;
  a reflective layer on a surface of the base substrate; and
  a plurality of reflective color films distributed at intervals in an array mode on a surface of the reflective layer opposite from the base substrate;
  wherein the plurality of reflective color films are configured to enable a light being reflected by the reflective layer and then passing through one of the plurality of the reflective color films to have a color; and
  wherein each of the plurality of reflective color films comprises:
    an aluminum oxide layer on the surface of the reflective layer opposite from the base substrate;
    a metal plasma nanostructure on a surface of the aluminum oxide layer opposite from the base substrate; and
  wherein the array substrate further comprises:
  a plurality of circuit structures;
  a first planarization layer; and
  a first electrode on a surface of the first planarization layer opposite from the base substrate;
  wherein the plurality of the circuit structures is arranged in a same layer as the plurality of the reflective color films and located between adjacent reflective color films; and
  the first planarization layer is on a surface of the plurality of reflective color films and the circuit structures opposite from the surface of the substrate.

12. The display panel according to claim 1, wherein the cover plate comprises:
  a transparent substrate;
  a black matrix on a surface of the transparent substrate facing the array substrate;
  a second planarization layer, wherein the second planarization layer and the black matrix are arranged in a same layer; and
  a second electrode on a surface of the black matrix and the second planarization layer facing the array substrate.

13. The display panel according to claim 12, wherein the cover plate further comprises spacers on a surface of the second electrode facing the liquid crystal layer.

14. A display apparatus comprising the display panel according to claim 1.

15. A method of fabricating a display panel, comprising:
  forming an array substrate and a cover plate opposite the array substrate;
  cell-assembling the array substrate and the cover plate; and
  forming a polarizer on a surface of the cover plate opposite from the array substrate,
  wherein forming the array substrate comprises:
    forming a reflective layer on a surface of a base substrate facing the cover plate; and
    forming a layer of a plurality of reflective color films on a surface of the reflective layer opposite from the base substrate, the reflective color films being distributed at intervals in an array mode on a surface of the reflective layer opposite from the substrate;
    wherein the plurality of reflective color films are configured to enable a light reflected by the reflective layer and passing through the reflective color films to have one of preset colors; and
  wherein each of the plurality of reflective color films comprises:
    an aluminum oxide layer on the surface of the reflective layer opposite from the base substrate;
    a metal plasma nanostructure on a surface of the aluminum oxide layer opposite from the base substrate; and
    the display panel is configured to enable the light being reflected by the reflective layer and then passing through the reflective color films to have a different color by changing a thickness of the aluminum oxide layer.

16. The method of fabricating a display panel according to claim 15, wherein forming the cover plate comprises:
  forming a black matrix and a second planarization layer, which are arranged in a same layer, on a transparent substrate; and
  forming a second electrode on a surface of the black matrix and the second planarization layer facing the array substrate.

17. The method of fabricating a display panel according to claim 16, wherein forming the cover plate further comprises forming spacers on a surface of the second electrode facing the liquid crystal layer.

* * * * *